United States Patent [19]

Waters

[11] Patent Number: 4,518,223

[45] Date of Patent: May 21, 1985

[54] AUTOMATIC MAGNIFICATION CHANGER FOR A SURGICAL MICROSCOPE

[75] Inventor: George F. Waters, Sturbridge, Mass.

[73] Assignee: Codman & Shurtleff, Inc., Randolph, Mass.

[21] Appl. No.: 519,292

[22] Filed: Aug. 1, 1983

[51] Int. Cl.³ .............................................. G02B 7/16
[52] U.S. Cl. .................................................. 350/254
[58] Field of Search ........................ 350/254, 520, 570

[56] References Cited

U.S. PATENT DOCUMENTS 4,262,989  4/1981  Waters ................................. 350/254

FOREIGN PATENT DOCUMENTS 19666   12/1980  European Pat. Off. ............ 350/254
3240401  5/1983  Fed. Rep. of Germany ...... 350/254
736036   5/1980  U.S.S.R. .............................. 350/254

Primary Examiner—William H. Punter
Attorney, Agent, or Firm—Donal B. Tobin

[57] ABSTRACT

A solenoid driven magnification changer shaft for a microscope with positive index stops. The solenoid shaft that both translates and rotates when the solenoid is activated. A coupler couples the solenoid shaft to the magnification changer shaft so as to permit the coupler to rotate as a unit with the magnification changer shaft but at the same time to translate axially on the magnification changer shaft.

The magnification changer shaft includes a slot extending axially from a point spaced from the end of the shaft and extending a predetermined distance. The coupler includes a recess for receiving the free end of the shaft and a transverse bore for receiving a pin which extends through the transverse bore and the slot in the magnification changer shaft.

The coupler and the surrounding driver housing include cooperating index pins and a stop pin. The index pin will be driven into interfering alignment with the stop pin when the solenoid shaft translates and will interfere with the stop pin when the solenoid shaft causes the coupler to rotate to provide a positive stop for the magnification changer shaft.

14 Claims, 3 Drawing Figures

FIG-2

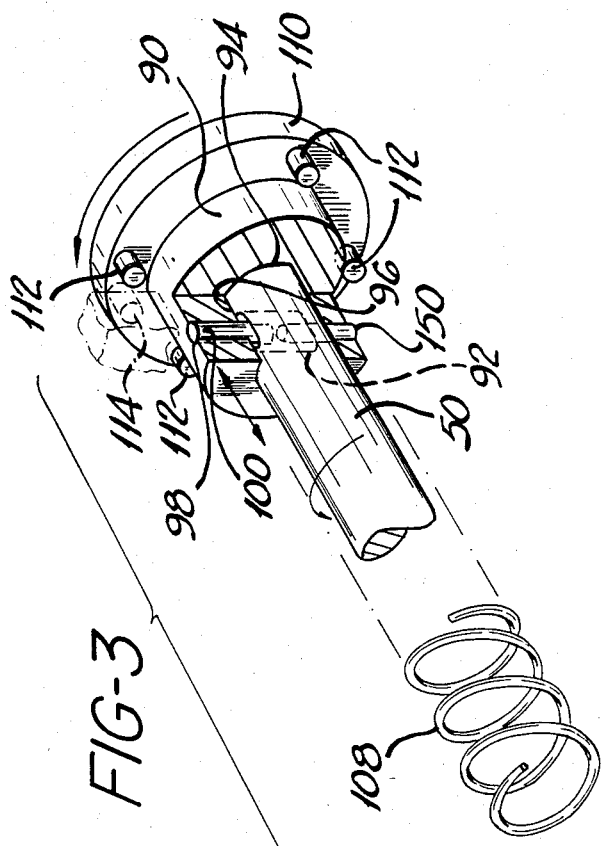

AUTOMATIC MAGNIFICATION CHANGER FOR A SURGICAL MICROSCOPE

The present invention relates to a magnification changer for a microscope and, in particular, a power-operated drive for a magnification changer.

Magnification changers have been used in the past in microscopes and have commonly had a number of sets of lenses mounted on a rotational shaft. The shafts have commonly been designed for manual rotation only. In surgical microscopes, it has often been desirable to change the magnification at instances when the surgeon does not have a free hand to use for that purpose.

Some power-operated devices already exist for changing the magnification of an operating microscope. The surgical microscope shown in U.S. Pat. No. 4,262,989 shows a satisfactory automatic magnification changer system using a solenoid. The indexing system on the invention shown in this patent uses a detent plate with V-grooves. The solenoid indexes the magnification changer a few degrees greater than the spacing of the V-grooves on the detent plate. The amount of rotation is selected to move the detent ball past the center of the groove and partly up the far wall without coming entirely out of the groove. When the rotary solenoid returns to rest, frictional slippage in the coupling provides sufficient drive to pull the shaft quickly back to where the ball centers in the bottom of the groove.

The solenoid is driven with a line voltage. To make sure that the solenoid provides enough energy to drive the detent out of the V-groove, a capacitor is included in the solenoid circuit to provide extra energy when the solenoid is first actuated. Although the solenoid only rotates for a fixed number of degrees (for example 95°) and then stops, the magnification changer shaft builds up a certain amount of momentum which may cause it to ride past the next detent even though the solenoid has deenergized. This could cause the magnification changer to be misaligned. It would, therefore, be desirable to have a drive mechanism which can accommodate a positive stop for the magnification changer shaft which would stop the shaft at the precise desired location so that it will not override the detent stop.

It is also important that the magnification changer also be operable manually.

SUMMARY OF THE INVENTION

The present invention relates to an automatic magnification changer with a positive stop mechanism that permits the magnification changer to index to its prescribed location without overriding a detent. There is also included a manual option for changing the magnification.

The present invention includes a magnification changer housing with a shaft which rotates with respect to the cavity defined by a housing. The magnification changer shaft supports a number of lenses which are mounted in the light path for the microscope and which permit the magnification of the microscope to be changed by rotating one series of lenses or another into the light path of the microscope.

The magnification changer includes a drive device, for example, a solenoid, and an input shaft which will rotate and translate predetermined amounts when the solenoid is activated. A special coupler is provided to couple the input shaft and the magnification changer shaft together. The coupler is coupled to the magnification changer shaft in such a way as to permit the coupler to rotate together with the magnification changer shaft as a unit but at the same time to translate axially along the magnification changer shaft. The system includes an index-stop mechanism which uses at least one index pin mounted to the coupler and at least one corresponding stop pin fixed about the coupler. When the drive mechanism activates, the coupler translates along the magnification changer shaft to put the index pin and the stop pin in an interfering relationship so that when the coupler rotates, interference will occur at the prescribed location to stop the magnification changer shaft at the desired index position and prohibit the shaft from overriding a detent.

Index position is provided by an annular collar mounted with respect to the magnification changer shaft and having at least one detent in its circumference. Correspondingly mounted to the inside of the magnification changer housing is a detent stop which is biased against the circumference of the detent collar so that the detent collar may be rotated to align the detent with the detent stop to provide precise positioning of the magnification changer shaft.

A spiral ratchet clutch is provided between the magnification changer shaft and the solenoid drive shaft which permits the solenoid to drive the magnification changer shaft in one direction of rotation but which permits the magnification changer shaft to rotate free of the solenoid input shaft in the other direction. Thus, power driven magnification change can be accomplished by driving the magnification changer shaft in one rotational direction with the solenoid, and manual operation can be accomplished by manually rotating the magnification shaft in the opposite direction and permitting the clutch to slip.

In addition to the features set forth in this summary, other features and advantages of the present invention will become apparent from the following detailed description of the preferred embodiments taken in conjunction with the following drawings.

DESCRIPTION OF THE DRAWINGS

FIG. 2 shows a front elevation of the microscope housing and drive mechanisms of the present invention, partly in section; and FIG. 3 shows a perspective view of an alternative embodiment of certain parts of the automatic drive mechanism for the magnification changer.

DETAILED DESCRIPTION OF THE PREFERRED EMBODIMENTS

Figure 1:
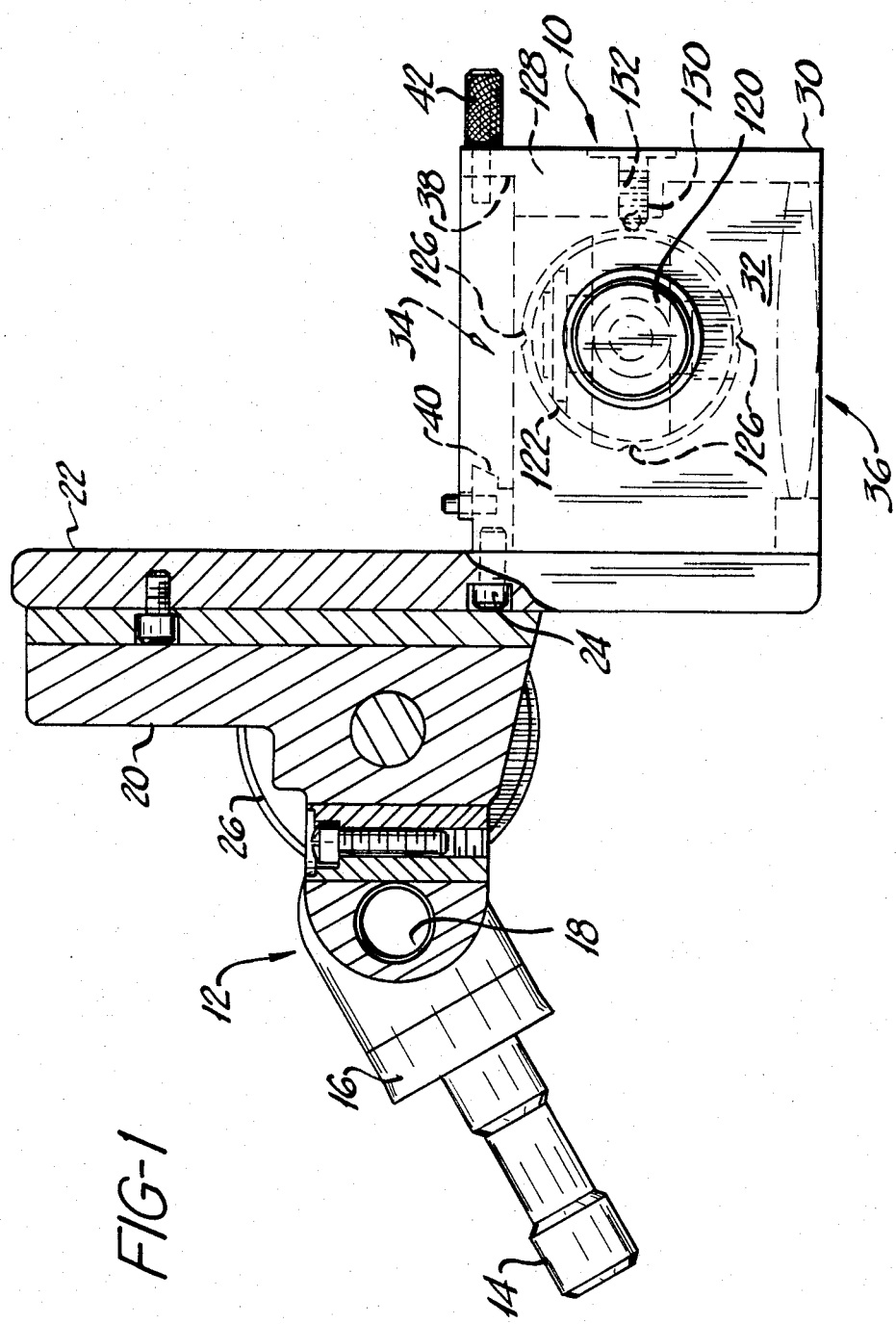
FIG. 1 shows a side elevation of the microscope housing and support assembly of the present invention shown partly in section.

Referring now to FIG. 1, there is shown a side elevation of the magnification changer housing 10 of the present invention and its associated support assembly 12. Support assembly 12 includes a shaft 14 which may be mounted to suitable structure (not shown) and a joint 16 for receiving shaft 14. Joint 16 pivots about pivot 18 and connects joint 16 to fine focus support 20. Mounting plate 22 connects to fine focus support 20 by means of a dovetailed slot and groove configuration well known to those in this art and, therefore, not shown in detail in the drawings. Housing 10 is bolted to mounting plate 22 by means of bolts 24. Fine focus adjusting knob 26 and operates through a well-known worm drive to raise and lower mounting plate 22 with respect to fine focus support 20 for adjusting the fine focus of the microscope.

Housing 10 includes a generally annular body 30 defining cavity 32 and having an open top 34 and open bottom 36. The open top 34 of housing body 30 is designed to receive a microscope (not shown) and to hold the microscope in fixed relationship with respect to housing body 30. The means for holding a microscope in the open top 34 of housing body 30 includes an annular recessed flange 38 extending circumferentially about open top 34, a lip 40 under which a corresponding projection of the microscope fits to hold the microscope in position and a set screw 42 projecting through housing body 30 in the vicinity of recess flange 38.

Figure 2:
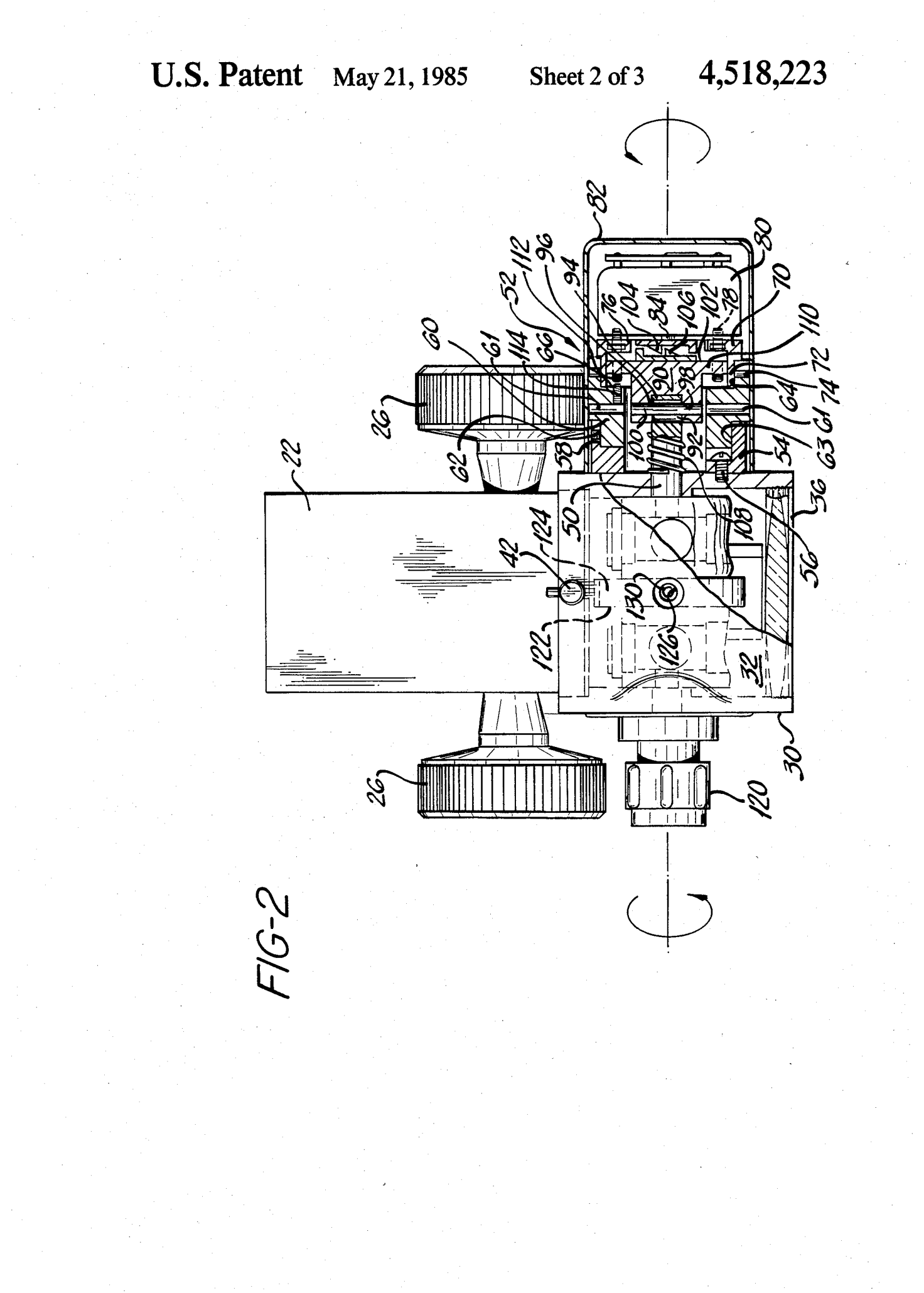

Referring now to FIG. 2, magnification changer shaft 50 extends across housing body 30 through cavity 32 and is supported for rotation within cavity 32 by suitable bearings (not shown) in the sidewall of body 30. A magnification drive housing 52 is affixed by suitable means to the outside of body 30 about magnification changer shaft 50. Drive housing 52 includes a generally annular housing mounting 54 affixed by means of bolts 56 to housing body 30. Housing mounting 54 includes a recessed flange 58. Housing 52 also includes a similarly annular coupler housing 60 with a recessed flange 63 on its outer circumference which mates with the recessed flange 58 of housing mounting 54. Housing mounting 54 and coupler housing 60 are connected together by suitable means, for example, set screws 62.

Coupler housing 60 also includes a second recessed flange 64 defining an axially facing wall 66 and access holes 61 extending across coupler housing 60, whose purpose will be explained later in this application.

Drive housing 52 also includes a generally annular connecting plate 70 having an axially extending flange 72 cooperating with and fitting within flange 64 of coupler housing 60. Coupler housing 60 and connecting blade 70 are affixed together by suitable means, for example, set screws 74. Connecting plate 70 also includes a radially extending flange 76 against which solenoid drive 80 may be mounted by means of screws 78. Cover 82 surrounds drive housing 52.

Still referring to FIG. 2, solenoid 80 includes a shaft 84 which translates and rotates when solenoid 80 is activated. Shaft 84 will be referred to as the input shaft to the drive mechanism.

Still referring to FIG. 2, the drive mechanism of the present invention includes a special coupler 90 for coupling magnification changer shaft 50 to solenoid shaft 84. Magnification changer shaft 50 includes a slot 92 extending axially along mechanism shaft 50 but spaced apart a short distance from free end 94 of magnification shaft 50. Coupler 90 has a coaxially aligned recess 96 for receiving the free end 94 of magnification changer shaft 50. Coupler 90 also has a transverse bore 98 extending transverse to the axis of magnification changer shaft 50 to accomodate a pin 100 which extends into transverse bore 98 through slot 92 to couple the free end 94 of magnification changer shaft 50 to coupler 90 in such a way as to permit coupler 90 and magnification shaft 50 to rotate as a unit but also to permit coupler 90 to translate with respect to shaft 50 a distance at least equal to the axial extent of slot 92.

Coupler housing 60 has two access holes 61 extending diametrically across coupler housing 60 to act as an access hole for removing pin 100 from coupler 90 if it is desired to disassemble the drive mechanism.

Still referring to FIG. 2, the other end of coupler 90 includes a transverse face 102 which can be connected to solenoid shaft 84. In the preferred embodiment, the means for connecting coupler 90 to solenoid shaft 84 includes two spiral grooved clutch plates 104 and 106 which permit solenoid shaft 84 to rotate in one direction without rotating coupler 90 but which drive coupler 90 and solenoid shaft 84 together when solenoid shaft 84 rotates in the other direction. This mechanism is commonly known as a spiral ratchet clutch with face 104 which is attached to solenoid drive shaft 84 being described as the drive plate and face 106 on coupler 90 being described as the driven plate.

A spring 108 is disposed about the circumference of magnification changer shaft 50 between the outside of housing body 30 and coupler 90 to bias clutch plates 104 and 106 together.

Still referring to FIG. 2, coupler 90 includes a radially extending flange 110 which supports a plurality of index pins 112 facing generally in the axial direction but radially spaced apart from the axis of coupler 90. Transverse wall 66 of coupler housing 60 supports preferably one stop pin 114 (but alternatively a plurality of stop pins 114) which are fixed to coupler housing 60 and disposed in fixed relationship with respect to coupler 90.

Referring again to FIGS. 1 and 2, there is shown the detent stops for the magnification changer. Affixed about shaft 50 within cavity 32 of housing 30 is a generally annular collar 122 having a circumferential surface 124 in which there are provided a plurality (preferably 4 but alternatively any desirable number) of detents 126 corresponding to the precise index locations of shaft 50. Extending from a support flange 128 on the interior of housing body 30 is a detent stop 130 which can include a set screw 132 having a hollow axial bore in which is placed a sping-loaded ball which is aligned with the detents 126 in the circumferential surface 124 of annular collar 122 so that as magnification changer shaft 50 is rotated, detent stop 130 will engage detent 126 to provide a positive positioning device for correctly aligning the position of shaft 50. Manual adjustment knob 120 is provided on the other end of shaft 50 remote from solenoid 80.

Clutch plates 104 and 106 permit shaft 50 to rotate in one direction (see arrow in FIG. 2) without rotating solenoid shaft 84. Thus, manual magnification changer can be operated by turning knob 120 without turning solenoid shaft 84.

In operation when solenoid 80 is at rest, bias spring 108 forces coupler 90 to the right in FIG. 2, so that none of index pins 112 contact stop pin 114. However, when solenoid 80 is activated and solenoid shaft 84 moves axially, coupler 90 is also caused to move axially so that index pins 112 are aligned in interfering relationship with stop pins 114. When solenoid shaft 84 rotates and correspondingly causes coupler 90 to rotate through ratchet clutch 104 and 106, one of index pins 112 will hit stop pins 114 and cause magnification changer shaft 50 to stop at a predetermined detent location even though shaft 50 may have sufficient momentum to carry shaft 50 and hence one of the position detents 126 in annular collar 122 past detent stop 130.

A plurality of lens sets of the kind disclosed in U.S. Pat. No. 4,262,989 and generally known to those skilled in this art will be aligned with the light path of the microscope to provide the desired magnification.

Index pins 112 are usually spaced equi-angularly about 90° apart to provide four specific stop locations for the magnification changer shaft. Although four stops are used most frequently, any suitable number of stops could be used.

Referring now to FIG. 3, there is shown a perspective view of an alternative embodiment of coupler 90. It can be seen that the free end 94 of shaft 50 fits into coaxial recess 96 in the end of coupler 90 and bore 98 in the end of coupler 90 is aligned with coaxial recess 96. Instead of slot 92 extending completely through shaft 50 to accommodate a pin 100, an alternative coupling may also be used, for example, slot 92 may extend only partially into shaft 50 from one side of shaft 50 or from both sides of shaft 50. In this case, pin 100 extends through transverse bore 98 and into coaxial recess 96 and then into this modified slot 92. Alternatively, two pins 100 may be used to extend into modified slots 92 from opposite sides of transverse bore 98. This alternative configuration would also permit coupler 90 and shaft 50 to rotate together as a unit but at the same time would permit coupler 90 to translate axially along shaft 50 a distance at least equal to the axial length of modified slot 92. Various other modifications to this coupler will be apparent to those skilled in the art.

Also shown in FIG. 3 are index pins 112 extending axially from flange 110 of coupler 90 and stop pin 114 is shown in phantom.

It will be appreciated that the present invention provides a magnification drive which provides positive stop for magnification changer shaft 50. The present invention has been described in conjunction with certain perferred embodiments. Those skilled in the art will appreciate that many modifications and changes may be made to the preferred embodiments without departing from the spirit of the present invention. It is, therefore, not intended to limit the present invention except as set forth in the following appended claims.

I claim:

1. A power operated drive for a magnification changer for a microscope comprising:
   a magnification changer housing defining a cavity aligned in the optical path of said microscope, said housing adapted to support said microscope with respect to said cavity;
   a magnification changer shaft at least a portion of which is mounted for rotation in said cavity;
   an input shaft for said drive mounted with respect to said housing;
   a selectably operable power source for simultaneously driving said input shaft through a predetermined angular rotation and a predetermined axial translation;
   means for coupling said input shaft and said magnification changer shaft together adapted to simultaneously rotate and translate with said input shaft to index said magnification changer shaft through a predetermined angular rotation;
   cooperative means having at least one first element disposed for rotation and translation with said coupling means and a second element fixed about said coupling means for stopping said magnification changer shaft at a precise position with respect to said microscope optical path as said input shaft rotates and translates;
   whereby when said input shaft translates said first element moves into interference alignment with said second element to prevent said magnification changer shaft from indexing past its prescribed position.

2. The apparatus of claim 1 wherein said coupling means includes a coupler having first and second ends axially spaced apart and having a first recess extending into said first end adapted to receive said magnification changer shaft;
   means cooperatively disposed on said coupler and said magnification shaft for coupling the two together to permit the two to rotate together as a unitary structure but also for permitting said coupler to translate in the axial direction along said magnification changer shaft.

3. The apparatus of claim 2 wherein said magnification changer shaft includes a first end confronting said coupler and a second end and said cooperating means disposed on said coupler and said magnification shaft includes a slot in said magnification changer shaft extending axially therealong a predetermined distance;
   a transverse bore extending into said coupler recess; and,
   a pin extending into said transverse bore of said coupler and into said axial slot of said magnification changer for coupling said magnification shaft and said coupler together.

4. The apparatus of claim 3 wherein said slot in said magnification changer shaft extends axially along said shaft from a point spaced apart from said first end of said magnification changer shaft.

5. The apparatus of claim 3 wherein said slot in said magnification changer shaft extends diametrically through said shaft, said transverse bore extends diametrically across said coupler in alignment with said coupler recess and said pin extends through said bore, recess and slot.

6. The apparatus of claim 1 wherein said coupling means includes:
   bias means for biasing said coupling means so as to keep said cooperating means out of interfering alignment when said power source is at rest.

7. The apparatus of claim 2 wherein said cooperating means includes at least one flange extending generally transversely to the axis of said coupler;
   said first element including at least one pin spaced radially apart from the axis of said coupler and facing in a generally axial direction of said coupler; and,
   said second element fixedly mounted about said coupler and spaced apart radially from said coupler so as to interfere with said first element pin at a prescribed angular position of said coupler.

8. The apparatus of claim 7 wherein said cooperating means includes a plurality of equi-angularly spaced apart first element pins corresponding to the various positions at which the magnification changer is desired to be positioned.

9. The apparatus of claim 2 wherein said second end of said coupler includes a first clutch plate and said input shaft supports a second clutch plate engageable with said first clutch plate for transmitting input shaft rotation and translation to said coupler.

10. The apparatus of claim 1 further including a drive housing mounted to said magnification changer housing and defining a space into which said magnification changer shaft may extend and within which said coupling means may be housed;
    said housing including a recessed flange for supporting said second element of said cooperating means.

11. The apparatus of claim 1 further including positioning means for the magnification changer comprising:
   at least one detent means operatively engaging said magnification changer shaft for positioning said magnification changer shaft at a predetermined rotational position.

12. The apparatus of the claim 11 wherein said detent means includes an annular collar fixedly mounted to said magnification changer shaft within said magnification changer housing, said annular collar including at least one detent disposed on a circumferencial surface thereof;
   a detent stop mounted in said magnification changer housing and operatively engaging said collar detent;
   whereby when said collar rotates into a position where said collar detent aligns with said detent stop, said detent stop will engage said detent to provide precise positioning of said magnification changer shaft.

13. A power operated drive for a magnification changer of a microscope comprising:
   a generally annular magnification changer housing defining a cavity aligned with the optical path of said microscope, said housing having a surrounding sidewall and an open top and an open bottom, said microscope adapted to be received on said open top of said magnification housing;
   a magnification changer shaft extending across said housing cavity and having first and second ends extending through said housing sidewalls and mounted for rotation therein;
   a generally cylindrical drive housing for said magnification changer shaft affixed to the sidewall of said magnification changer housing and disposed about said first end of said magnification changer shaft;
   a solenoid mounted in said drive housing and having an input shaft extending into said drive housing aligned generally coaxially with said first end of said first magnification changer shaft;
   a coupler having a first and second end axially spaced apart, said first end having a recess for receiving the first end of said magnification changer shaft and said second end operatively engaging said input shaft;
   means cooperatively disposed on said magnification changer shaft and said coupler for coupling the two together to permit said coupler and said magnification changer shaft rotate together as a unit but simultaneously to permit said coupler to move axially along said magnification changer shaft;
   cooperating means having at least one first element disposed on said coupler and adapted to rotate and translate therewith and having a second element affixed to said drive housing and disposed about said coupler for stopping said magnification changer shaft at precise positions with respect to said microscope optical path as said input shaft rotates and translates.

14. The apparatus of claim 9 wherein said first and second clutch plates include cooperating spiral ratchets to permit said clutch to engage and drive said magnification changer shaft in one direction of rotation when said input shaft rotates and to permit said clutch to slip when said magnification changer shaft is rotated manually in the opposite direction.

* * * * *